United States Patent
Tanaka et al.

(10) Patent No.: US 12,214,428 B2
(45) Date of Patent: Feb. 4, 2025

(54) INSERT AND CUTTING TOOL INCLUDING SAME

(71) Applicant: KYOCERA CORPORATION, Kyoto (JP)

(72) Inventors: Ayano Tanaka, Otsu (JP); Ryoma Nomiyama, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 654 days.

(21) Appl. No.: 17/605,234

(22) PCT Filed: Apr. 20, 2020

(86) PCT No.: PCT/JP2020/017056
§ 371 (c)(1),
(2) Date: Oct. 21, 2021

(87) PCT Pub. No.: WO2020/218241
PCT Pub. Date: Oct. 29, 2020

(65) Prior Publication Data
US 2022/0176463 A1  Jun. 9, 2022

(30) Foreign Application Priority Data
Apr. 22, 2019  (JP) .................................. 2019-080607

(51) Int. Cl.
B23B 27/16 (2006.01)
(52) U.S. Cl.
CPC ................................. B23B 27/1611 (2013.01)

(58) Field of Classification Search
None
See application file for complete search history.

(56) References Cited

U.S. PATENT DOCUMENTS

| | | | |
|---|---|---|---|
| 5,643,658 A * | 7/1997 | Uchino | C23C 30/005 428/467 |
| 8,415,033 B2 * | 4/2013 | Matsuzawa | B23B 51/00 51/307 |
| 2006/0171837 A1 | 8/2006 | Heinrich et al. | |

FOREIGN PATENT DOCUMENTS

| | | |
|---|---|---|
| EP | 0569696 A2 | 11/1993 |
| JP | 2011218481 A | 11/2011 |
| JP | 2012245581 A | 12/2012 |
| JP | 5334486 B2 | 11/2013 |

* cited by examiner

*Primary Examiner* — Seth Dumbris
(74) *Attorney, Agent, or Firm* — HAUPTMAN HAM, LLP

(57) ABSTRACT

An insert includes a base of a cermet including hard particles and a binder phase. The base includes first and second surfaces, a cutting edge on at least a part of a ridge line of the first and second surfaces, a third surface opposite to the first surface, and a through hole from the first surface to the third surface. An inner wall constituting the through hole includes a binder-phase-riched layer having a higher content of the binder phase than an inside of the base, at least in a center part. A thickness of the binder-phase-ricked layer in the center part is larger than a thickness of the binder-phase-ricked layer in an end part of the inner wall. A cutting tool includes a holder which has a pocket located at an end, the insert located in the pocket, and a clamp inserted in the through hole of the insert.

20 Claims, 7 Drawing Sheets

INSERT AND CUTTING TOOL INCLUDING SAME

RELATED APPLICATIONS

The present application is a National Phase of International Application Number PCT/JP2020/017056, filed Apr. 20, 2020, which claims priority to Japanese Application Number 2019-080607, filed Apr. 22, 2019.

TECHNICAL FIELD

The present disclosure relates to an insert for use in a cutting process, and a cutting tool including the insert.

BACKGROUND

Cermets including titanium (Ti) as a main component are now widely used as bases of members requiring wear resistance, sliding property, and chipping resistance, such as cutting tools, wear-resistant members, and sliding members.

For example, Patent Document 1 describes a surface-coated titanium carbide based cermet cutting insert having a through hole for mounting to a tool body. It is described in Patent Document 1 that a metal oozing layer is formed on an inner surface of the through hole for mounting to provide an insert with less abnormal damage even in high-load cutting.

RELATED ART DOCUMENTS

Patent Document

Patent Document 1: Japanese Unexamined Patent Publication No. 2012-245581

SUMMARY

An insert according to the present disclosure includes a base which is a cermet including hard particles and a binder phase. The base includes a first surface, a second surface, a cutting edge located on at least a part of a ridge line of the first surface and the second surface, a third surface located opposite to the first surface, and a through hole from the first surface to the third surface. An inner wall constituting the through hole includes a binder-phase-ricked layer having a higher content of the binder phase than an inside of the base, at least in a center part. A thickness T1 of the binder-phase-ricked layer in the center part is larger than a thickness T2 of the binder-phase-ricked layer in an end part.

A cutting tool according to the present disclosure includes a holder which has a length from a first end to a second end and includes a pocket located at a side of the first end, the insert located in the pocket, and a clamp inserted in the through hole of the insert.

EMBODIMENTS

<Insert>

Figure 1:
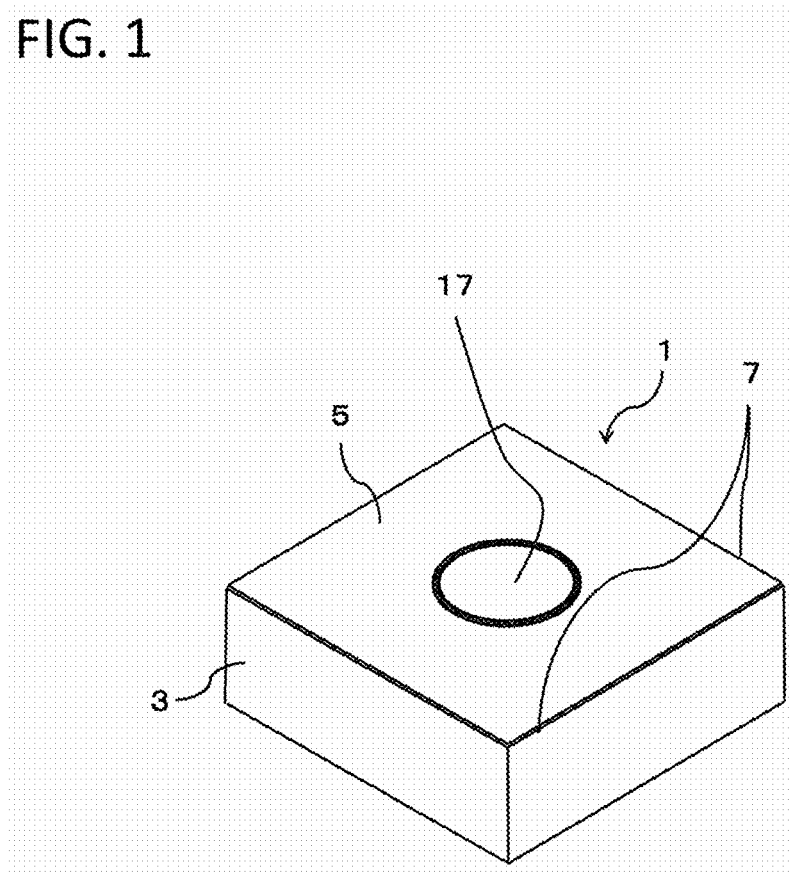
FIG. 1 is a perspective view illustrating an example of an insert according to the present disclosure.

An insert according to the present disclosure will be described in detail below with reference to the drawings. For the sake of description, the drawings referred to in the following illustrate, in a simplified form, only main members necessary for describing an embodiment. The insert according to the present disclosure is therefore capable of including any arbitrary structural member not illustrated in the drawings referred to. Sizes of the members in each of the drawings faithfully represent neither sizes of actual structural members nor size ratios of these members. The same applies to a cutting tool as will be described later.

The insert according to the present disclosure includes a base which is a cermet including hard particles and a binder phase. The hard particles are, for example, TiCN, TiC, TiN, and (TiM)CN (where M is one or more kinds selected from W, Nb, Ta, Mo, and V). The binder phase includes an iron group metal such as Ni or Co as a main component. The term "main component" denotes a component of 50% by mass or more among the constituent components.

Figure 2:
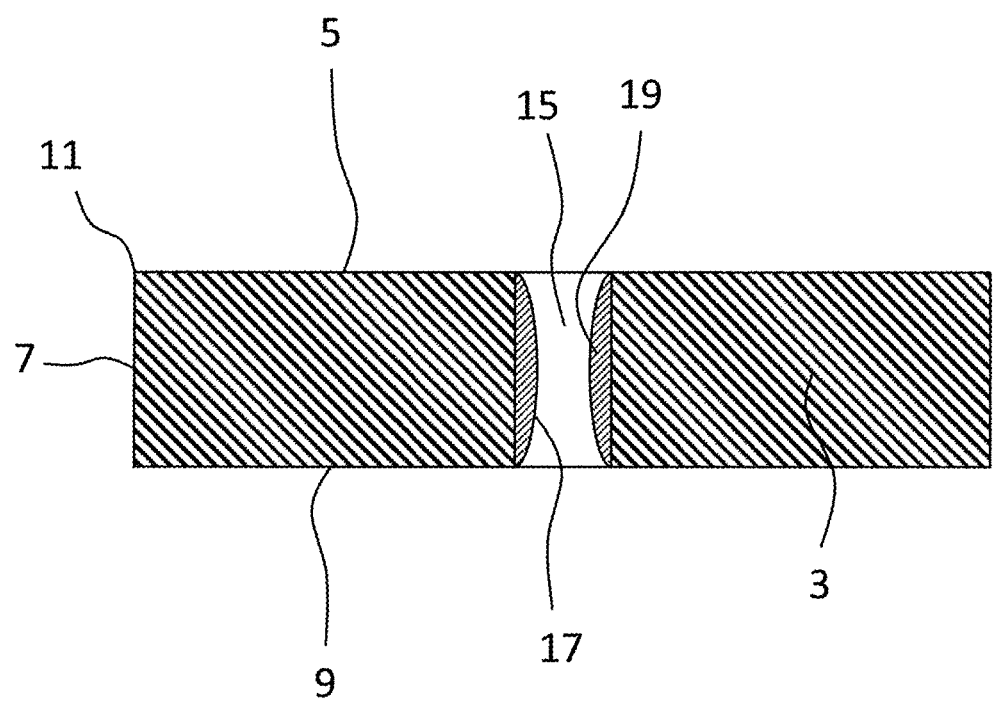
FIG. 2 is a schematic diagram in a cross section illustrating an example of the insert according to the present disclosure.

As illustrated in FIGS. 1 and 2, an insert 1 of the present disclosure may be, for example, a quadrangular plate shape. A first surface 5, which is an upper surface in FIG. 1, is a rake surface. The insert 1 includes a second surface 7 which is a side surface connected to the first surface 5.

The insert 1 includes a third surface 9, which is a lower surface located opposite to the first surface 5. The second surface 7 is connected to each of the first surface 5 and the third surface 9.

The insert 1 according to the present disclosure includes a cutting edge 13 located on at least a part of a ridge line 11 where the first surface 5 intersects with the second surface 7. In other words, the insert 1 includes the cutting edge 13 located on at least a part of the ridge line 11 where the rake surface intersects with the flank surface.

The entirety of an outer periphery of the first surface 5 may correspond to the cutting edge 13 in the insert 1. However, the insert 1 is not limited to the above configuration. For example, the cutting edge 13 may be located on only one side or a part of the rake surface having the quadrangular shape.

Figure 3:
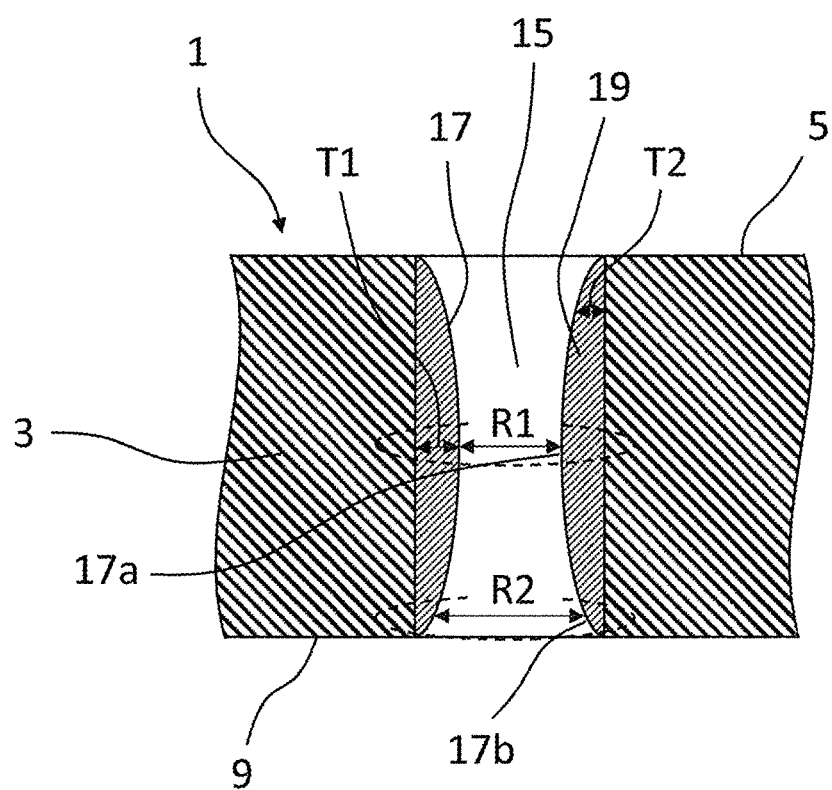
FIG. 3 is an enlarged schematic diagram of a cross section of the insert according to the present disclosure.

The insert 1 according to the present disclosure includes a through hole 15 from the first surface 5 to the third surface 9 and penetrating a base 3. As illustrated in FIG. 3, an inner wall 17 constituting the through hole 15 includes a binder-phase-ricked layer 19 including hard particles and a binder phase and having a higher content of the binder phase than an inside of the base 3, at least in a center part 17a. The inside of the base 3 denotes the part that is 500 μm or more away from the surface of the base 3. The binder-phase-ricked layer 19 may not need to be located in all of the inner wall 17 of the through hole 15, and it may be located at least in the center part 17a.

The center part 17a is a center part if the through hole 15 is divided into nine equal parts in a depth direction. An end part 17*b* is an end part if the through hole 15 is divided into nine equal parts in the depth direction.

As illustrated in FIG. 3, in the insert 1 according to the present disclosure, a thickness T1 of the binder-phase-ricked layer 19 in the center part 17*a* of the inner wall 17 constituting the through hole 15 is larger than a thickness T2 of the binder-phase-ricked layer 19 in the end part 17*b* of the inner wall 17 constituting the through hole 15. The thickness T1 of the binder-phase-ricked layer 19 in the center part 17*a* and the thickness T2 of the binder-phase-ricked layer 19 in the end part 17*b* are average values, respectively. T1 and T2 may be measured by observing the cross section of the insert 1 by using a metallurgical microscope or an electron microscope. The binder-phase-ricked layer 19 may not need to be located in the end part 17*b*.

Since the insert 1 according to the present disclosure has such a configuration, it is possible to prevent the insert 1 from being abnormally damaged starting from the inner wall 17 to which a large force is applied when the insert 1 is fixed to a holder (not illustrated).

The binder-phase-ricked layer 19 has a lower hardness than the base 3, and has a higher hardness than the metal oozing layer described in Cited Document 1. Therefore, the binder-phase-ricked layer 19 is less deformable than the metal oozing layer.

With the above-described configuration, when the insert 1 is fixed to the holder by a clamp, local force applied to the base 3 is small due to the suppressed deformation of the binder-phase-ricked layer 19 in the center part 17*a* at the contact between the center part 17*a* in the inner wall 17 and the clamp, so that the insert 1 is less likely to crack and to be abnormally damaged.

Although no particular limitations are imposed on size of the insert 1, for example, a length of one side of the rake surface is settable to approximately 3 to 20 mm. Additionally, a thickness of the insert 1 is settable to approximately 1 to 20 mm, for example. Although the insert 1 having the quadrangular shape is illustrated in FIG. 1, for example, it may be a triangular shape or a disk shape.

Figure 4:
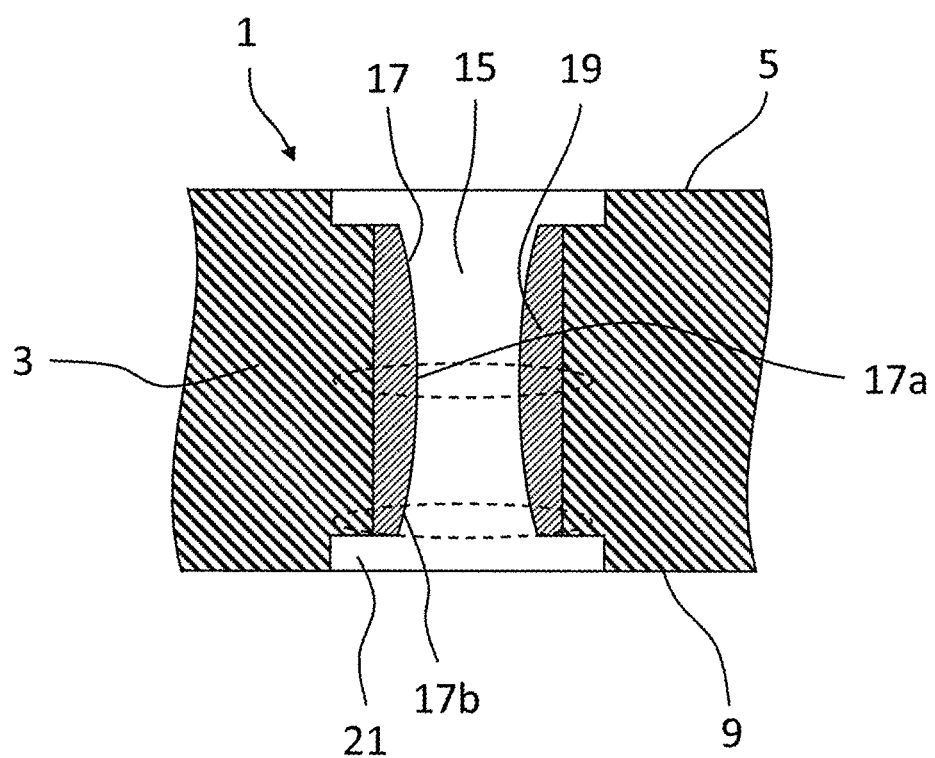
FIG. 4 is an enlarged schematic diagram of a cross section of an insert according to another embodiment of the present disclosure.

As illustrated in FIG. 4, the insert 1 according to the present disclosure may have an enlarged diameter part 21 connecting to the inner wall 17. There is a step at the boundary between the through hole 15 and the enlarged diameter part 21. Although the binder-phase-ricked layer 19 is not included in the inner wall of the enlarged diameter part 21 in the example illustrated in FIG. 4, it may be also located in the enlarged diameter part 21. In the insert 1 of the present disclosure, the enlarged diameter part 21 is not included in the through hole 15. The enlarged diameter part 21 is a so-called counterbore surface. A diameter of the enlarged diameter part 21 is at least 300 μm or more larger than the diameter of the through hole 15.

The thickness T1 of the binder-phase-ricked layer 19 in the center part 17*a* may be 1 μm or more. Further, T1 may be 20 μm or less. With such a configuration, abnormal damage to the insert 1 is suppressed. T1 may be 3 μm or more. Further, T1 may be 10 μm or less.

The thickness T2 of the binder-phase-ricked layer 19 in the end part 17*b* may be 0.2 μm or more. Further, T2 may be 6 μm or less. With such a configuration, abnormal damage to the insert 1 is suppressed.

Figure 5:
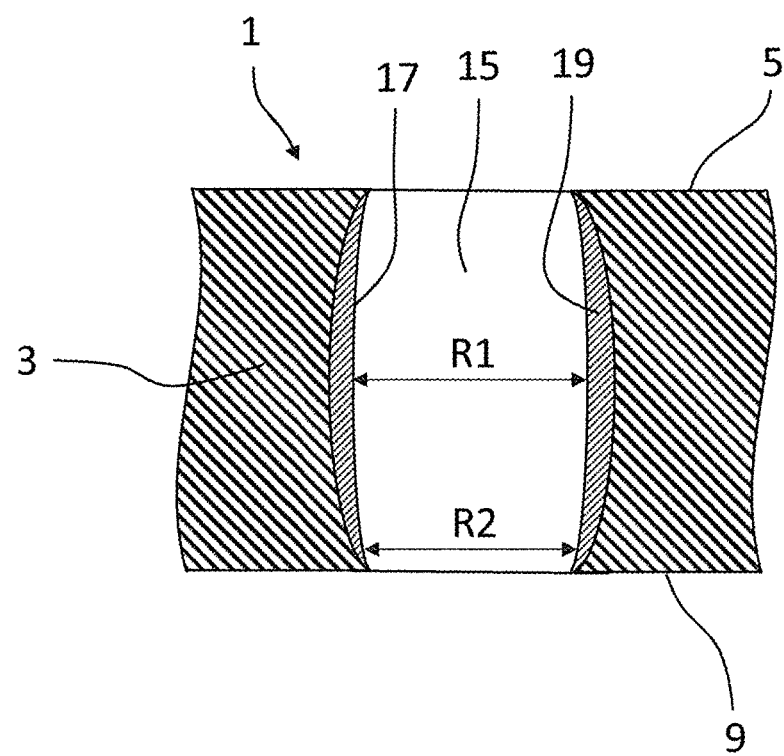
FIG. 5 is an enlarged schematic diagram of a cross section of an insert according to another embodiment of the present disclosure.

As illustrated in FIG. 5, a diameter R1 in the center part 17*a* may be larger than a diameter R2 in the end part 17*b*. With such a configuration, the contact area between the clamp and the inner wall 17 becomes large, and the clamping force increases.

The diameter R1 in the center part 17*a* may be 5 μm or more, and 30 μm or less larger than the diameter R2 in the end part 17*b*. With such a configuration, abnormal damage to the insert 1 is suppressed.

A hardness of the binder-phase-ricked layer 19 in the center part 17*a* may be 10 GPa or more, and 20 GPa or less. With such a configuration, the binder-phase-ricked layer 19 deforms appropriately when it is in contact with a clamping pin, and the clamping force increases. The hardness of the binder-phase-ricked layer 19 in the center part 17*a* may be measured by measuring the exposed binder-phase-ricked layer 19 in the cross section of the insert 1 by using a nanoindentation method.

The binder-phase-ricked layer 19 in the center part 17*a* may include a metal layer (not illustrated) having a higher content of the binder phase than the binder-phase-riched layer 19 at a side of a through axis of the through hole 15. The metal layer does not include a hard layer and is formed with metal only. With such a configuration, the metal layer functions as an absorbing material between the clamp described later and the binder-phase-ricked layer 19, so that abnormal damage to the insert 1 is suppressed. A thickness of the metal layer may be 0.3 μm or more, and 2 μm or less.

The insert 1 may include a coating layer (not illustrated) on the binder-phase-ricked layer 19 in the center part 17*a*. The coating layer is a hard layer including, for example, TiCN, TiN, TiCNO, $Al_2O_3$ or the like. The coating layer includes a part having a higher hardness than the binder-phase-ricked layer 19. With such a configuration, wear resistance of the clamp part increases. The coating layer may be a single layer or a laminated layer. The coating layer may be formed by a CVD method or a PVD method.

<Method for Manufacturing Insert>

A method for manufacturing an insert according to the present disclosure is described below.

Raw material powders used for manufacturing the insert of the present disclosure are typically used in manufacture of cermets. The insert of the present disclosure can be obtained by controlling composition and sintering conditions of the base and a processing method of the base.

The composition of the base may, for example, include 40% by mass or more, and 80% by mass or less of TiCN which is a hard particle, and 6% by mass or more, and 30% by mass or less of Co which is a binder phase. Additionally, WC, TaC, NbC, $Mo_2C$, VC, ZrC or the like may be further included to improve the characteristics.

The raw material having the composition described above is used to mold the material into a shape having a space which will become a through hole after sintering. Then, for example, the material is sintered at a temperature of 1400° C. or more, and 1600° C. or less. This sintering atmosphere may be set to an $N_2$ partial pressure atmosphere.

When the $N_2$ partial pressure is 1 kPa or more, a thickness of a binder-phase-ricked layer after sintering becomes larger. Further, when a mean particle size d50 of the hard particles used as a raw material is 0.7 μm or less, the binder-phase-ricked layer including a metal layer having a higher content of the binder phase at a side of a though axis (not illustrated) of the though hole than the binder-phase-ricked layer can be obtained.

If the molding pressure is high during the above molding, deformation during sintering can be suppressed. On the contrary, if the molding pressure is low during molding, a diameter R1 in a center part of an inner wall tends to be larger than a diameter R2 in an end part. The relationship between the molding pressure and the deformation varies depending on the composition and the sintering temperature, and it may be adjusted in various combinations.

For example, the insert of the present disclosure can be obtained by inserting a rotating brush into the through hole from both ends of the through hole after sintering, polishing the inner wall of the through hole, and setting a thickness T1 of the binder-phase-ricked layer in the center part to be larger than a thickness T2 of the binder-phase-riched layer at the end part. The brush may be inserted from both sides of the through hole, or may be inserted in two steps from one side.

Subsequently, a coating layer (not illustrated) may be formed if necessary. The coating layer may be a so-called hard layer, and may be formed by, for example, a PVD method or a CVD method. The coating layer may be a single layer or a laminated layer.

As a coating layer, for example, known materials such as TiN, TiCN, TiCNO, $Al_2O_3$, and TiAlN can be used. A coating layer including a material other than the above examples may be used.

At the time of sintering, the binder-phase-ricked layer may be located in a region other than the through hole, for example, in the first surface, the second surface or the third surface, but the binder-phase-ricked layer may be removed if necessary.

<Cutting Tool>

Next, a cutting tool according to the present disclosure will be described below with reference to the drawings.

Figure 6:
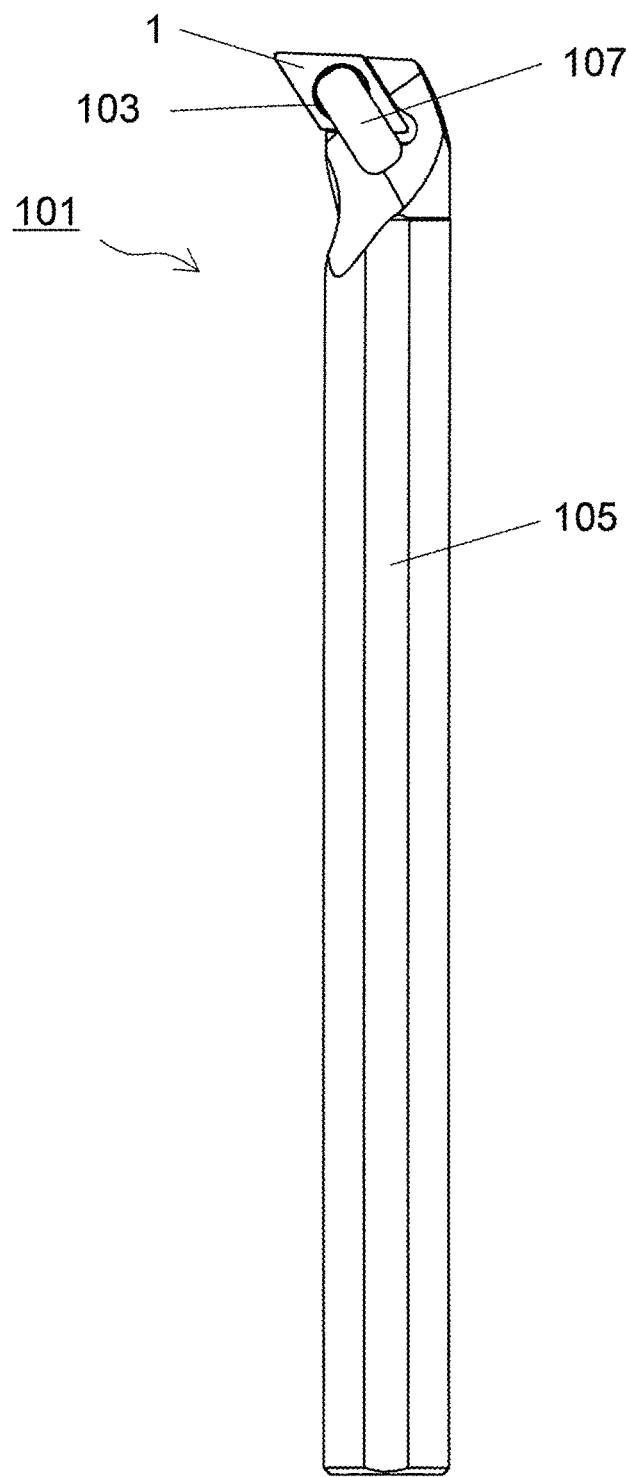
FIG. 6 is a plan view illustrating an example of a cutting tool according to the present disclosure.

As illustrated in FIG. 6, a cutting tool 101 according to the present disclosure is a bar-shaped body extended, for example, from a first end (an upper end in FIG. 6) toward a second end (a lower end in FIG. 6). As illustrated in FIG. 6, the cutting tool 101 includes a holder 105 with a pocket 103 located at a side of the first end (tip end), and the insert 1 located in the pocket 103.

Figure 7:
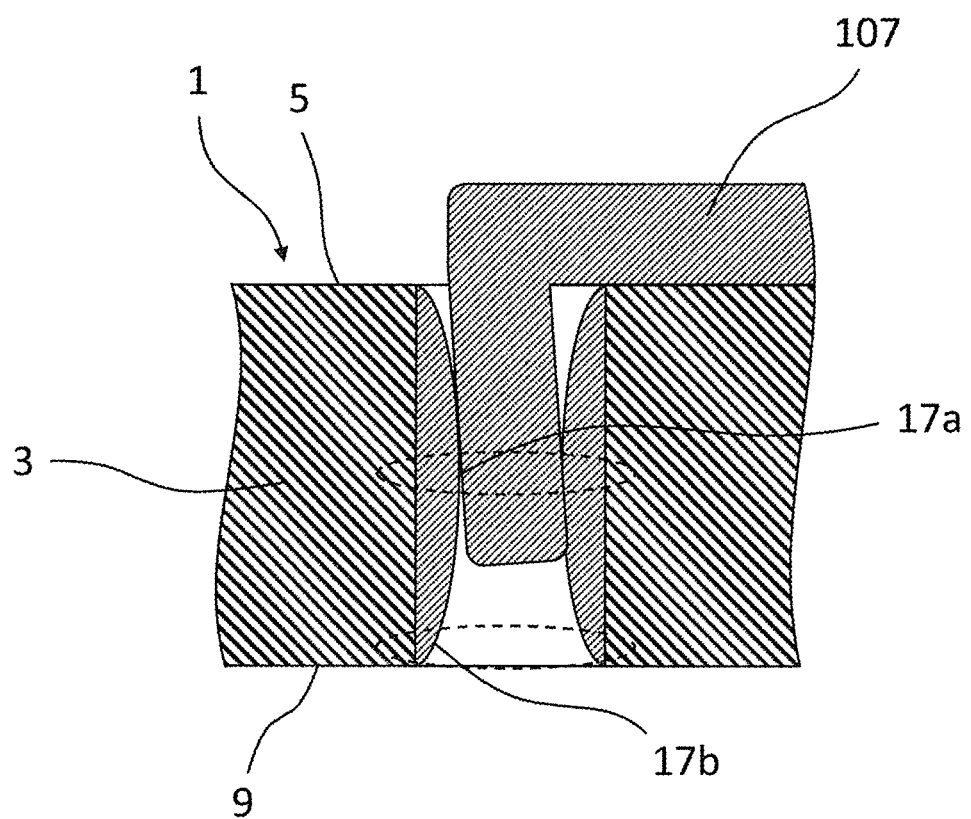
FIG. 7 is an enlarged schematic diagram of a cross section of the insert in the cutting tool according to the present disclosure.

Further, as illustrated in FIG. 7, a clamp 107 is inserted into the through hole 15 of the insert 1. In the example illustrated in FIG. 7, the clamp 107 is in a direct or indirect contact with the binder-phase-ricked layer 19 located in the center part 17a. The indirect contact between the clamp 107 and the binder-phase-ricked layer 19 denotes a state in which a metal layer 23 or a coating layer is located between the binder-phase-ricked layer 19 and the clamp 107. Since the binder-phase-ricked layer 19, with which the clamp 107 is in contact, is more easily deformed than the base 3, a strong force is hardly applied to the insert 1 locally. Further, when the binder-phase-ricked layer 19 is included, the contact area between the clamp 107 and the binder-phase-ricked layer 19 is large, so that the insert 1 is hardly moved in the pocket during cutting. Due to these effects, the insert 1 of the present disclosure is less likely to be abnormally damaged. The cutting tool 101 including the insert 1 provides the cutting process stably for the long period of time.

The pocket 103 is a part that permits attachment of the insert 1. The pocket 103 includes a seating surface parallel to a lower surface of the holder 105, and a constraining side surface inclined relative to the seating surface. The pocket 103 opens into the side of the first end of the holder 105.

The insert 1 is located in the pocket 103. A lower surface of the insert 1 may be in a direct contact with the pocket 103. Alternatively, a sheet (not illustrated) may be held between the insert 1 and the pocket 103.

The insert 1 is attached to the holder 105 so that at least a part of the ridge line where the rake surface intersects with the flank surface, which is usable as the cutting edge 13, is protruded outward from the holder 105. The insert 1 is attached to the holder 105 by a fixing screw 107 in the embodiment. Specifically, the insert 1 is attachable to the holder 105 in such a manner that screw parts are engaged with each other by inserting the fixing screw 107 into the through hole 15 of the insert 1, and by inserting a front end of the fixing screw 107 into a screw hole (not illustrated) formed in the pocket 103.

For example, steel and cast iron are usable as a material of the holder 105. Of these materials, high toughness steel may be used.

The embodiment has illustrated and described the cutting tools 101 for use in the so-called turning process. Examples of the turning process include inner diameter processing, outer diameter processing, grooving process and end surface processing. The cutting tools 101 are not limited to ones which are used for the turning process. For example, the inserts 1 of the above embodiments are applicable to the cutting tools 101 for use in the milling process.

Example

An insert according to the present disclosure will be described below.

The base was manufactured as follows. A molded body in a tool shape having a through hole was manufactured by adding a binder to raw material powders including 40% by mass of TiCN, 12% by mass of TiN, 20% by mass of WC, 8% by mass of NbC, 20% by mass of Co, and other inevitable carbides, and forming it into a desired shape by a press molding. These raw material powders are typically used in manufacture of cermets. The composition for the base of the present disclosure is not special. Then, after removing the binder component, an insert including a binder-phase-ricked layer having a metal layer in an inner wall of the through hole was obtained by sintering the molded body in a nitrogen atmosphere of 3 kPa under a condition of holding it at a temperature of 1530° C. for 1 hour.

Then, the inner wall of the through hole was polished with a brush, and the insert having the configuration shown in Table 1 was manufactured. In the part where the binder-phase-ricked layer is not included or the thickness of the binder-phase-ricked layer is thin, the polishing time by the brush was set longer.

TABLE 1

| Sample No. | Presence or absence of binder-phase-riched layer | Presence or absence of metal layer | Thickness of binder-phase-riched layer (μm) | |
|---|---|---|---|---|
| | | | T1 | T2 |
| 1 | Absence | Absence | — | — |
| 2 | Presence | Absence | 0.1 | 0.1 |
| 3 | Presence | Absence | 1.0 | 0.2 |
| 4 | Presence | Absence | 5.0 | 0.8 |
| 5 | Presence | Absence | 10.0 | 2.0 |
| 6 | Presence | Absence | 20.0 | 6.0 |
| 7 | Presence | Absence | 15.0 | 10.0 |
| 8 | Presence | Absence | 21.0 | 6.0 |
| 9 | Presence | Absence | 2.0 | 10.0 |

In each of the inserts, a first surface, a second surface, and a third surface were blasted to remove the binder-phase-ricked layer.

Polishing by the brush was performed by applying a polishing liquid in which diamond powder of 0.1 to 3 μm and lubricating oil were mixed to a pig bristle brush and inserting the pig bristle brush into the through hole while rotating it.

Thicknesses in the center part and the end part of the binder-phase-riched layer, and diameters R1 in the center part and R2 in the end part were measured in a cross section obtained by cutting the base in a surface including the through axis in the thickness direction.

Moreover, when the hardness in the inside of the base and the hardness of the binder-phase-ricked layer were measured by using the cross section of the insert, the hardness of the binder-phase-ricked layer was lower than the hardness of the inside of the base.

The obtained insert was placed in a pocket of a holder, a clamp was inserted into the through hole of the insert, and the insert was fixed with the clamp. Then, a cutting test was conducted under the following conditions.

<Chipping Resistance Test>

Workpiece: SCM435 with 4 grooves (5 mm wide)
Cutting speed: 300 m/min
Feed: 0.3 mm/rev
Depth of cut: 0.5 mm
Cutting state: wet
Evaluation method: The presence or absence of a state of a chipping or a defect after applying the impacts of 10000 times was determined.

Abnormal damages occurred in samples Nos. 1, 2 and 9, which do not have the configuration of the insert according to the present disclosure. The abnormal damage was suppressed in the insert of the present disclosure. Additionally, the insert was well held in the holder, and the surface roughness of the processed workpiece was excellent.

The insert and the cutting tool including the same of the present disclosure described above are illustrated by way of example and may have a different configuration without departing from the scope of the subject application.

The invention claimed is:

1. An insert, comprising a base which is a cermet comprising hard particles and a binder phase, wherein
the base comprises
a first surface,
a second surface,
a cutting edge located on at least a part of a ridge line of the first surface and the second surface,
a third surface located opposite to the first surface, and
a through hole from the first surface to the third surface,
an inner wall constituting the through hole comprises a binder-phase-riched layer having a higher content of the binder phase than an inside of the base, at least in a center part,
a thickness T1 of the binder-phase-riched layer in the center part is larger than a thickness T2 of the binder-phase-riched layer in an end part of the inner wall, and
the thickness T1 is 1 μm or more, and 20 μm or less.

2. The insert according to claim 1, wherein the thickness T2 is 0.2 μm or more, and 6 μm or less.

3. The insert according to claim 1, wherein a diameter R1 in the center part is larger than a diameter R2 in the end part.

4. The insert according to claim 3, wherein the diameter R1 is 5 μm or more, and 30 μm or less larger than the diameter R2.

5. The insert according to claim 1, wherein a hardness of the binder-phase-riched layer in the center part is 10 GPa or more, and 20 GPa or less.

6. The insert according to claim 1, wherein the binder-phase-riched layer in the center part comprises a metal layer having a higher content of the binder phase than the binder-phase-riched layer at a side of a through axis of the through hole.

7. The insert according to claim 1, comprising a coating layer on the binder-phase-riched layer in the center part, wherein the coating layer comprises a part having a higher hardness than that of the binder-phase-riched layer.

8. A cutting tool, comprising:
a holder which has a length extending from a first end to a second end, and which comprises a pocket located at a side of the first end;
the insert according to claim 1, the insert being located in the pocket; and
a clamp inserted in the through hole of the insert.

9. An insert, comprising a base which is a cermet comprising hard particles and a binder phase, wherein
the base comprises
a first surface,
a second surface,
a cutting edge located on at least a part of a ridge line of the first surface and the second surface,
a third surface located opposite to the first surface, and
a through hole from the first surface to the third surface,
an inner wall constituting the through hole comprises a binder-phase-riched layer having a higher content of the binder phase than an inside of the base, at least in a center part,
a thickness T1 of the binder-phase-riched layer in the center part is larger than a thickness T2 of the binder-phase-riched layer in an end part of the inner wall, and
the thickness T2 is 0.2 μm or more, and 6 μm or less.

10. The insert according to claim 9, wherein a diameter R1 in the center part is larger than a diameter R2 in the end part.

11. The insert according to claim 10, wherein the diameter R1 is 5 μm or more, and 30 μm or less larger than the diameter R2.

12. The insert according to claim 9, wherein a hardness of the binder-phase-riched layer in the center part is 10 GPa or more, and 20 GPa or less.

13. The insert according to claim 9, wherein the binder-phase-riched layer in the center part comprises a metal layer having a higher content of the binder phase than the binder-phase-riched layer at a side of a through axis of the through hole.

14. The insert according to claim 9, comprising a coating layer on the binder-phase-riched layer in the center part, wherein the coating layer comprises a part having a higher hardness than that of the binder-phase-riched layer.

15. A cutting tool, comprising:
a holder which has a length extending from a first end to a second end, and which comprises a pocket located at a side of the first end;
the insert according to claim 10, the insert being located in the pocket; and
a clamp inserted in the through hole of the insert.

16. An insert, comprising a base which is a cermet comprising hard particles and a binder phase, wherein
the base comprises
a first surface,
a second surface,
a cutting edge located on at least a part of a ridge line of the first surface and the second surface,
a third surface located opposite to the first surface, and
a through hole from the first surface to the third surface,
an inner wall constituting the through hole comprises a binder-phase-riched layer having a higher content of the binder phase than an inside of the base, at least in a center part, a thickness T1 of the binder-phase-riched layer in the center part is larger than a thickness T2 of the binder-phase-riched layer in an end part of the inner wall, and a diameter R1 in the center part is larger than a diameter R2 in the end part.

17. The insert according to claim 16, wherein the diameter R1 is 5 μm or more, and 30 μm or less larger than the diameter R2.

18. The insert according to claim 16, wherein a hardness of the binder-phase-riched layer in the center part is 10 GPa or more, and 20 GPa or less.

19. The insert according to claim 16, wherein the binder-phase-riched layer in the center part comprises a metal layer having a higher content of the binder phase than the binder-phase-riched layer at a side of a through axis of the through hole.

20. The insert according to claim 16, comprising a coating layer on the binder-phase-riched layer in the center part, wherein the coating layer comprises a part having a higher hardness than that of the binder-phase-riched layer.

* * * * *